(12) United States Patent
Wei

(10) Patent No.: US 11,499,694 B1
(45) Date of Patent: Nov. 15, 2022

(54) VEHICLE WARNING LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/696,775

(22) Filed: Mar. 16, 2022

(51) Int. Cl.
| | |
|---|---|
| *F21S 43/245* | (2018.01) |
| *B60Q 1/00* | (2006.01) |
| *B60Q 1/26* | (2006.01) |
| *F21S 43/20* | (2018.01) |
| *F21S 43/239* | (2018.01) |
| *F21S 43/249* | (2018.01) |
| *F21S 43/14* | (2018.01) |
| *B60Q 1/50* | (2006.01) |
| *F21Y 115/10* | (2016.01) |

(52) U.S. Cl.
CPC .......... *F21S 43/245* (2018.01); *B60Q 1/0011* (2013.01); *B60Q 1/0088* (2013.01); *B60Q 1/2696* (2013.01); *B60Q 1/50* (2013.01); *F21S 43/14* (2018.01); *F21S 43/239* (2018.01); *F21S 43/249* (2018.01); *F21S 43/26* (2018.01); *F21Y 2115/10* (2016.08)

(58) Field of Classification Search
CPC ........ F21S 43/245; F21S 43/249; F21S 43/14; F21S 43/239; F21S 43/26; B60Q 1/0011; B60Q 1/0088; B60Q 1/2696; B60Q 1/50
USPC ........................................................ 362/511
See application file for complete search history.

(56) References Cited

U.S. PATENT DOCUMENTS

| | | | | |
|---|---|---|---|---|
| 5,711,588 | A * | 1/1998 | Rudisill | F21S 43/14 362/23.05 |
| 5,803,579 | A * | 9/1998 | Turnbull | B60L 3/0023 362/800 |
| 2002/0030998 | A1* | 3/2002 | Natsume | F21S 43/26 362/543 |
| 2004/0141323 | A1* | 7/2004 | Aynie | F21S 43/245 362/308 |
| 2004/0239243 | A1* | 12/2004 | Roberts | B60Q 1/2665 257/E25.02 |
| 2006/0034094 | A1* | 2/2006 | Asada | F21V 5/045 362/545 |
| 2006/0083016 | A1* | 4/2006 | Okamura | F21V 7/0091 362/245 |

(Continued)

*Primary Examiner* — Bryon T Gyllstrom
(74) *Attorney, Agent, or Firm* — Muncy, Geissler, Olds & Lowe, P.C.

(57) ABSTRACT

A vehicle warning lamp is provided, including: a base, including a receiving room, the receiving room extending in an axial direction; a light-emitting module, disposed within the receiving room, the light-emitting module including at least one light-emitting member; and a light guide, including a first side and a second side opposite to each other, the second side facing toward the light-emitting module, the first side including a first diffuser, the light-emitting module being located within an axial projection area of the first diffuser, the second side including at least one inclined portion and at least one plane portion, the at least one plane portion being perpendicular to the axial direction, each of the at least one inclined portion including a second diffuser which is located outside the axial projection area of the first diffuser.

10 Claims, 5 Drawing Sheets

(56) References Cited

U.S. PATENT DOCUMENTS

| | | | |
|---|---|---|---|
| 2015/0316227 A1* | 11/2015 | Sahlin | G02B 6/0076 |
| | | | 362/511 |
| 2017/0254500 A1* | 9/2017 | Leugers | F21S 43/241 |
| 2019/0064423 A1* | 2/2019 | McCarter | G02B 6/001 |
| 2022/0252229 A1* | 8/2022 | Choi | F21K 9/68 |

* cited by examiner

VEHICLE WARNING LAMP

BACKGROUND OF THE INVENTION

Field of the Invention

The present invention relates to a vehicle warning lamp.

Description of the Prior Art

With the advancement of science and technology in recent years, the car-making process has also continued to evolve, and the lamps for vehicles are also constantly innovating. The fish-eye structure is usually applied to the lamps for vehicles in order to increase condensing and brightness of the light; or in order to increase the visual pattern recognition of the warning lamp (such as brake lamp, direction lamp, rear mirror lamp, etc.), the lamp for vehicle includes lamp shell which has a non-light-guiding portion and a light-guiding portion, so that the warning lamp will show a pattern when it lights. However, the light of the lamp which is blocked by the non-light-guiding portion will be wasted, and the light out from the light-guiding portion is, mostly, excessively bright for eyes.

The present invention is, therefore, arisen to obviate or at least mitigate the above-mentioned disadvantages.

SUMMARY OF THE INVENTION

The main object of the present invention is to provide a vehicle warning lamp which can effectively show the pattern effect, provides high lighting efficiency, and prevents dazzling due to the light.

To achieve the above and other objects, a vehicle warning lamp is provided, including: a base, including a receiving room, the receiving room extending in an axial direction; a light-emitting module, disposed within the receiving room, the light-emitting module including at least one light-emitting member; and a light guide, including a first side and a second side opposite to each other, the second side facing toward the light-emitting module, the first side including a first diffuser, the light-emitting module being located within an axial projection area of the first diffuser, the second side including at least one inclined portion and at least one plane portion, the at least one plane portion being perpendicular to the axial direction, each of the at least one inclined portion including a second diffuser which is located outside the axial projection area of the first diffuser.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
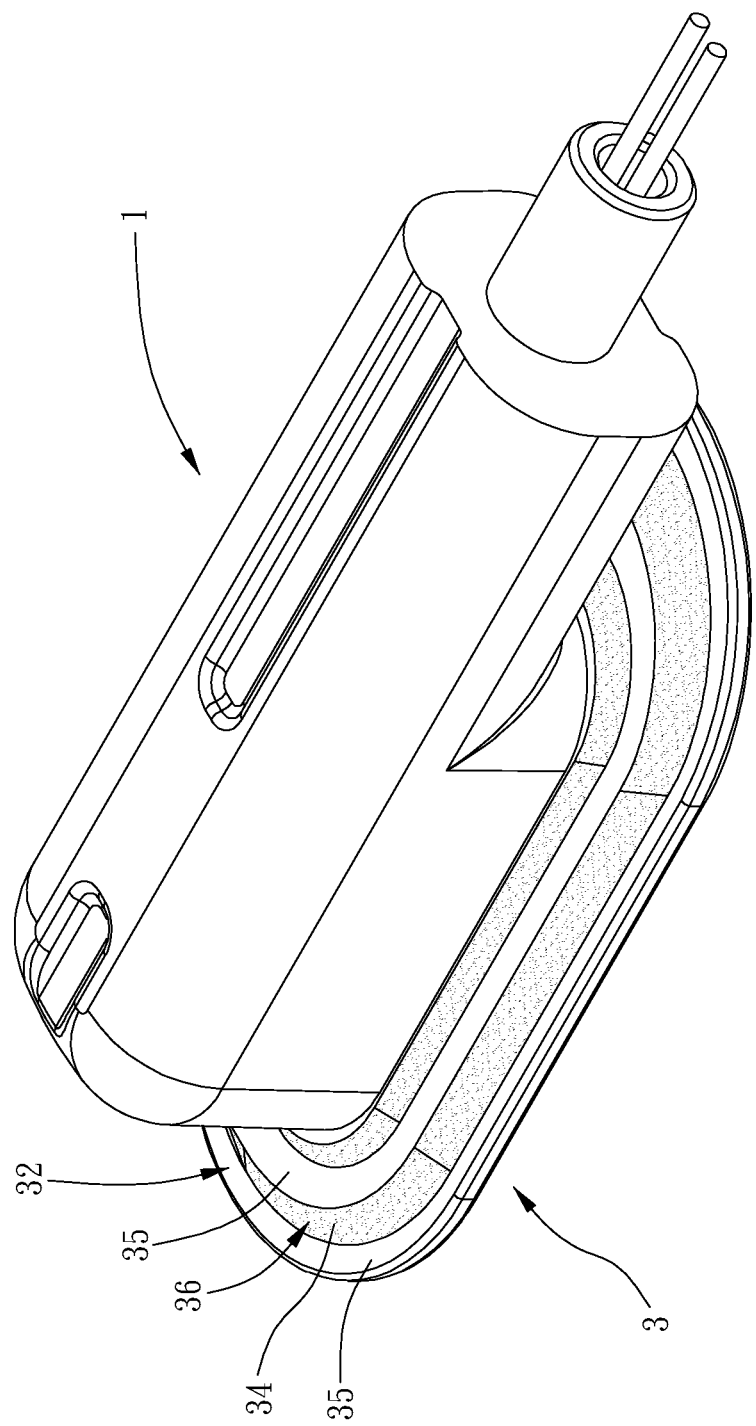
FIG. 1 is a stereogram of a preferable embodiment of the present invention.
Figure 2:
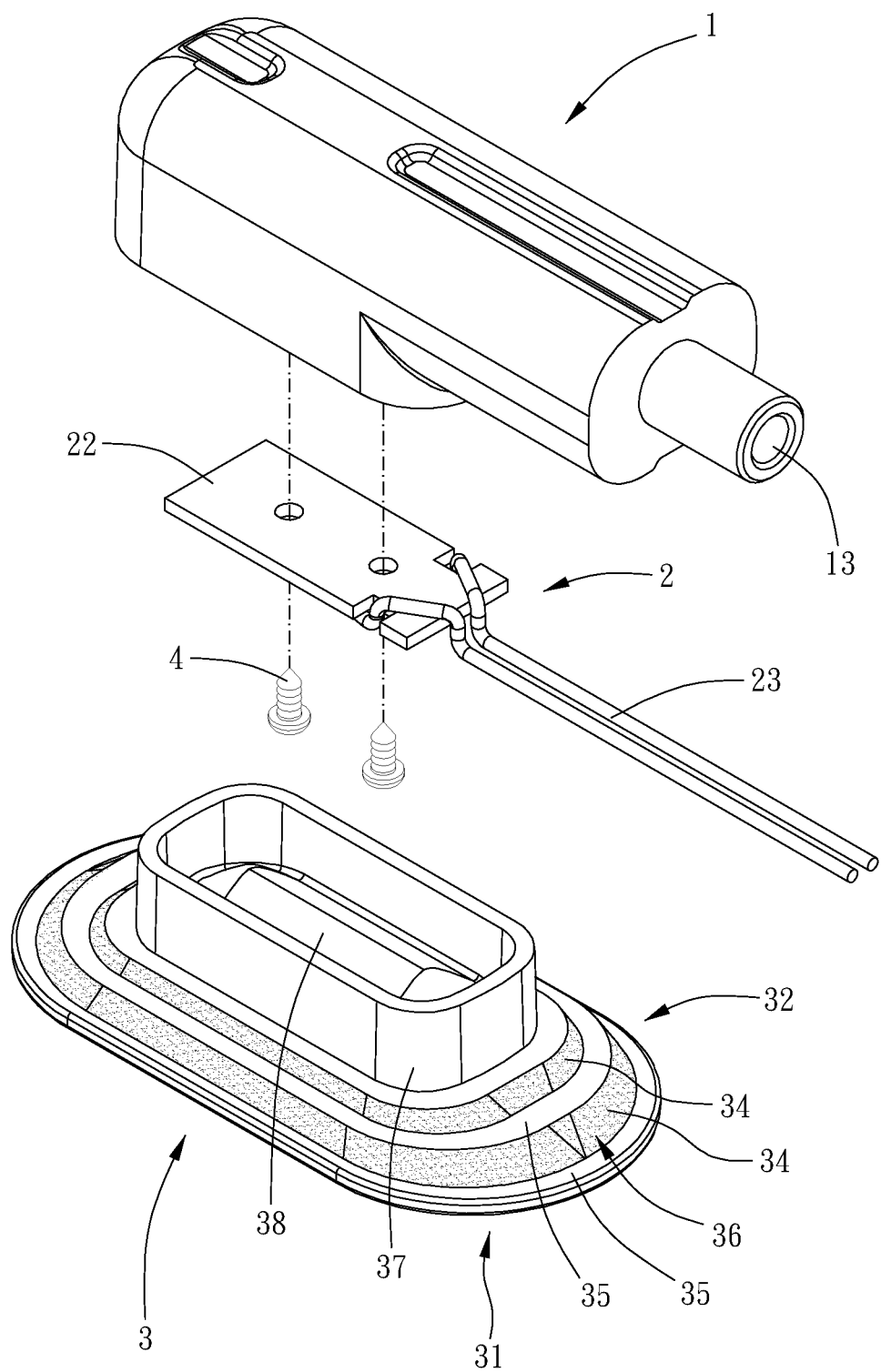
FIGS. 2 and 3 are breakdown drawings in different view angles according to a preferable embodiment of the present invention.
Figure 3:
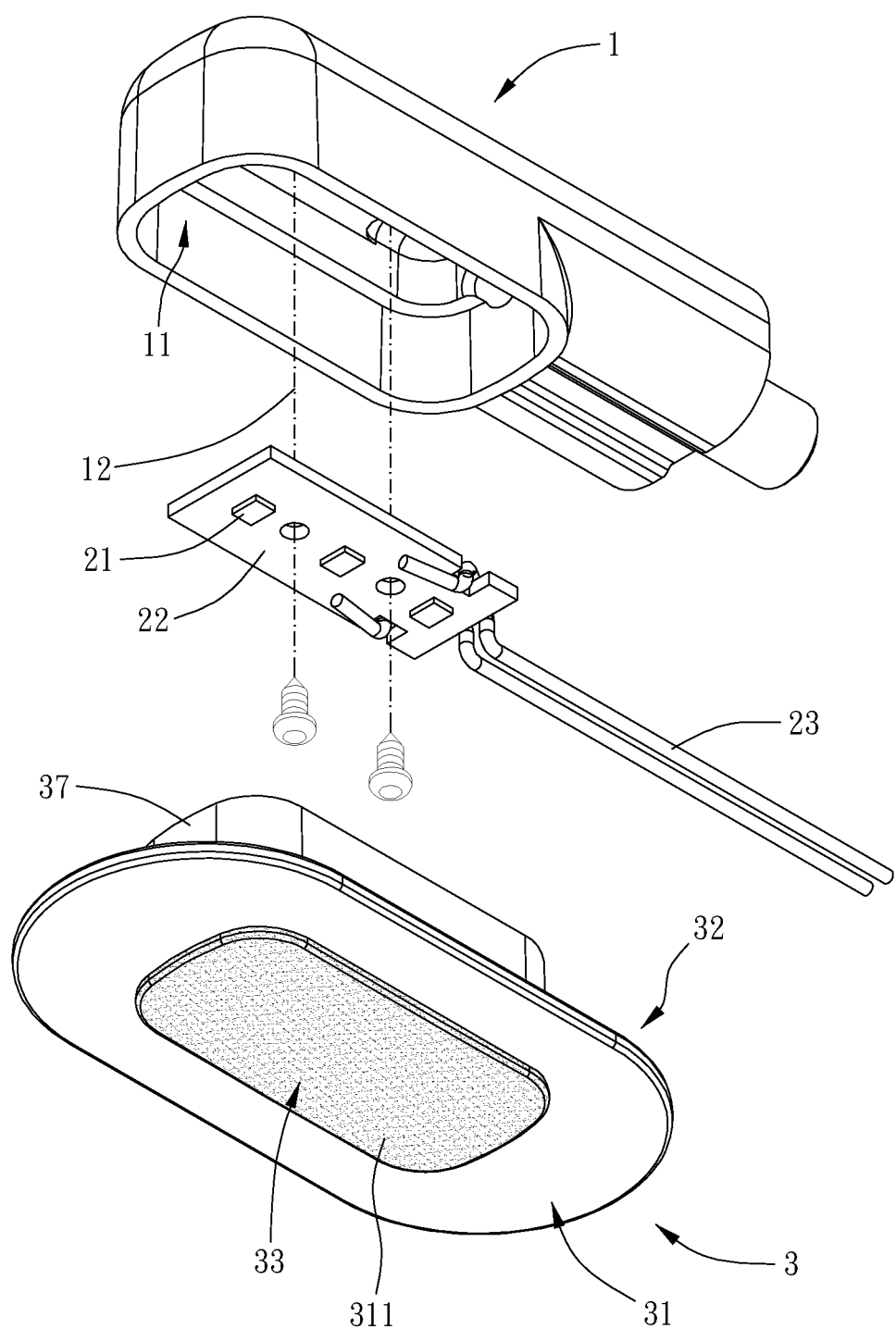
Figure 4:
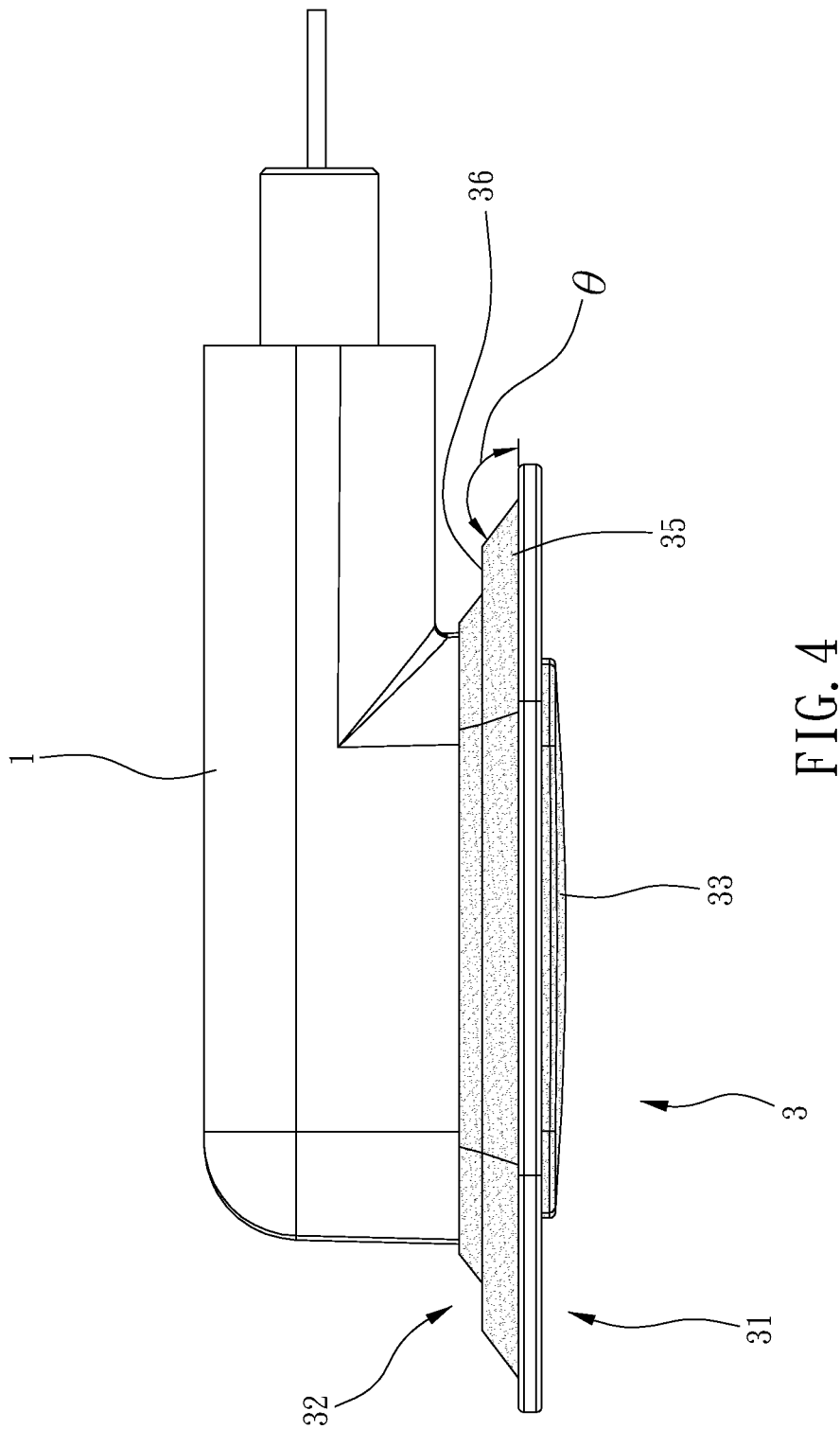
FIG. 4 is a side view of a preferable embodiment of the present invention.

Please refer to FIGS. 1 to 5 for a preferable embodiment of the present invention. A vehicle warning lamp of the present invention includes a base 1, a light-emitting module 2 and a light guide 3.

The base 1 includes a receiving room 11, and the receiving room 11 extends an axial direction 12.

The light-emitting module 2 is disposed within the receiving room 11, and the light-emitting module 2 includes at least one light-emitting member 21. In this embodiment, the light-emitting module 2 includes a plurality of the light-emitting members 21, and each of the at least one light-emitting member 21 is a LED member, providing good lighting performance and being energy-saving.

The light guide 3 includes a first side 31 and a second side 32 opposite to each other, the second side 32 faces toward the light-emitting module 2, the first side 31 includes a first diffuser 33, and the light-emitting module 2 is located within an axial projection area of the first diffuser 33. The second side 32 includes at least one inclined portion 34 and at least one plane portion 35, the at least one plane portion 35 is perpendicular to the axial direction 12, and each of the at least one inclined portion 34 includes a second diffuser 36 which is located outside the axial projection area of the first diffuser 33.

Figure 5:
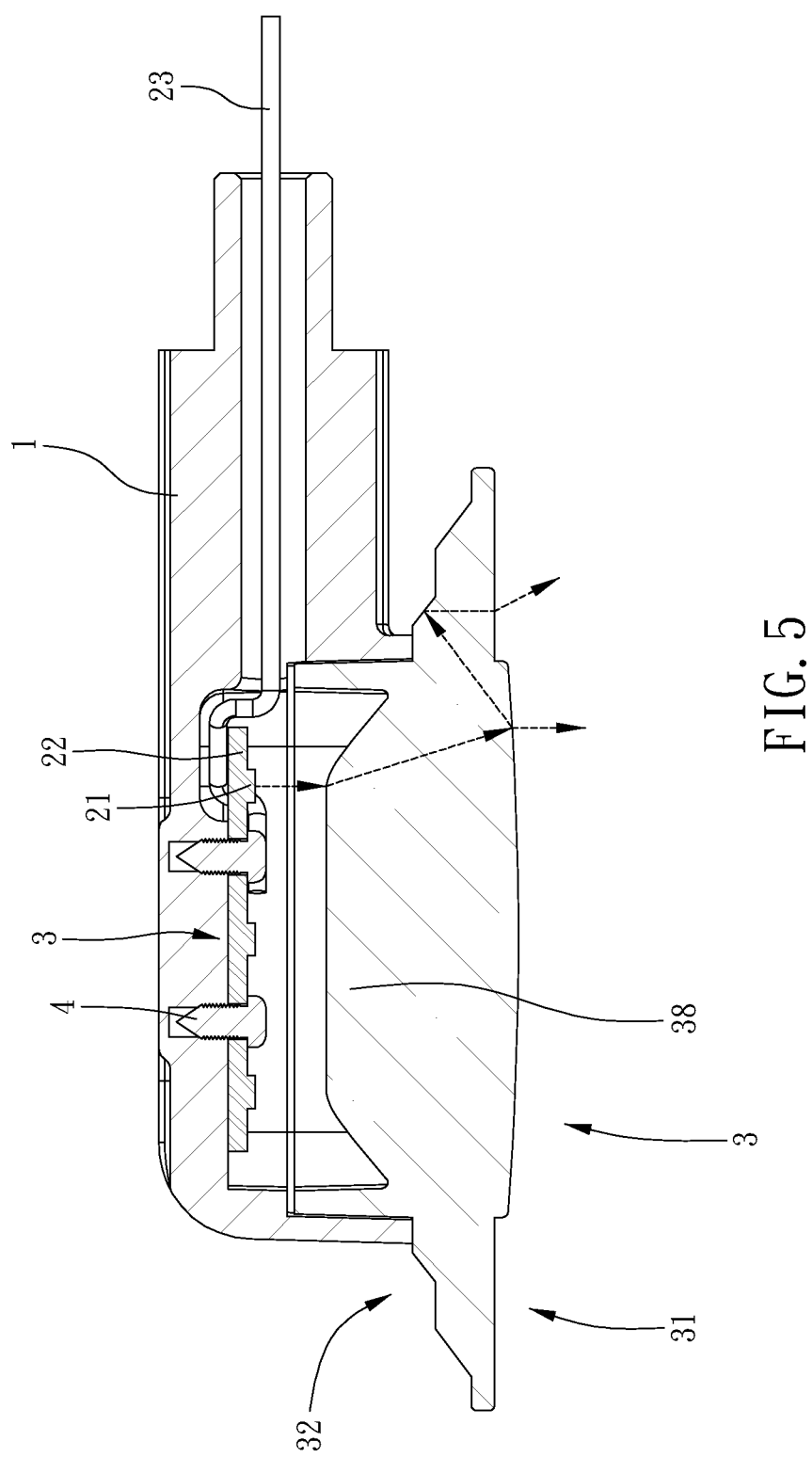
FIG. 5 is a drawing showing operation of a preferable embodiment of the present invention.

Since the light-emitting module 2 is located within the axial projection area of the first diffuser 33, the light can project to the first diffuser 33, part of the light projects out from the second side 32, and part of the light is reflected from the first diffuser 33 to the second diffuser 36 and reflected toward and then projects out from the second side 32 (as shown in FIG. 5), which improves the light efficiency. As a result, it can be seen that the shape shown by the first diffuser 33 and the at least one second diffuser 36, and it can avoid the dazzling caused by the light projecting directly to the outside.

Specifically, the second side 32 includes an annular wall 37, the annular wall 37 is inserted in the receiving room 11, and the at least one inclined portion 34 and the at least one plane portion 35 are disposed around the annular wall 37. Each of the at least one inclined portion 34 is inclined from the second side 32 toward the first side 31, which can reflect the light to the first side 31.

The at least one plane portion 35 is perpendicular to the axial direction 12, the at least one inclined portion 34 and the at least one plane portion 35 define an included angle θ, and the included angle θ ranges between 95 degrees and 145 degrees. In this embodiment, the included angle θ is preferably but not limited to 145 degrees.

Specifically, the at least one inclined portion includes at least two the plane portion 35, and the at least one plane portion includes at least two the inclined portion 34. One of the at least two plane portions 35 is located between one of the two at least inclined portions 34 and a periphery of the second side 32, and between neighboring two of the at least two inclined portions 34 is one of the at least two plane portions 35, so that the first diffuser 33 and the second diffuser 36 are distanced from each other, which provides good recognition. In this embodiment, the at least one inclined portion 34 and the at least one plane portion 35 are annular, the at least one inclined portion 34 and the at least one plane portion 35 are concentrically arranged; however, the at least one inclined portion and the at least one plane portion may be arranged in other configuration.

Specifically, the light-emitting module 2 includes a circuit board 22 and a plurality of light-emitting members 21, and the plurality of light-emitting members 21 are disposed on a side of the circuit board 22 facing toward the light guide 3. Preferably, the first diffuser 33 is located within the axial projection area of the first diffuser 33, which prevents the light form projects directly to outside. Preferably, the first diffuser 33 and the second diffuser 36 each include a rugged microstructure, wherein the rugged microstructure may be integrally formed on the first diffuser 33 or/and the second diffuser 36 by surface processing, or the rugged microstructure may be a coated layer coated on or attached to the first diffuser 33 or/and the second diffuser 36.

In this embodiment, the base 1 further includes a through hole 13 in communication with the receiving room 11, the light-emitting module 2 includes a conductive member 23, and the conductive member 23 is disposed through the through hole 13 and connected to the circuit board 22, for supplying electric power. The circuit board 22 is secured to a bottom of the receiving room 11 by at least one threaded fastener 4, which provides good fixation of the circuit board 22 to the base 1.

Preferably, the second side 32 further includes a lens 38, and the annular wall 37 surrounds the lens 38, which can sufficiently reflect the light from the plurality of light-emitting members.

Preferably, the first side 31 further includes a projection 311 projecting in the axial direction 12, the projection 311 includes the first diffuser 33, and the projection 311 can avoid the first side 31 from being abraded or damaged.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle warning lamp, including:
   a base, including a receiving room, the receiving room extending in an axial direction;
   a light-emitting module, disposed within the receiving room, the light-emitting module including at least one light-emitting member; and
   a light guide, including a first side and a second side opposite to each other, the second side facing toward the light-emitting module, the first side including a first diffuser, the light-emitting module being located within an axial projection area of the first diffuser, the second side including at least one inclined portion and at least one plane portion, the at least one plane portion being perpendicular to the axial direction, each of the at least one inclined portion including a second diffuser which is located outside the axial projection area of the first diffuser.

2. The vehicle warning lamp of claim 1, wherein the second side includes an annular wall, the annular wall is inserted in the receiving room, and the at least one inclined portion and the at least one plane portion are disposed around the annular wall.

3. The vehicle warning lamp of claim 2, wherein the second side further includes a lens, and the annular wall surrounds the lens.

4. The vehicle warning lamp of claim 2, wherein each of the at least one inclined portion is inclined from the second side toward the first side; the at least one plane portion is perpendicular to the axial direction, the at least one inclined portion and the at least one plane portion define an included angle therebetween, and the included angle ranges between 95 degrees and 145 degrees; the at least one inclined portion includes at least two inclined portions, the at least one plane portion includes at least two plane portions, one of the at least two plane portions is located between one of the two at least inclined portions and a periphery of the second side, and between neighboring two of the at least two inclined portions is one of the at least two plane portions; the at least one inclined portion and the at least one plane portion are annular, and the at least one inclined portion and the at least one plane portion are concentrically arranged; the light-emitting module includes a circuit board and a plurality of light-emitting members, the plurality of light-emitting members are disposed on a side of the circuit board facing toward the light guide, the receiving room is located within the axial projection area of the first diffuser, and the first diffuser and the second diffuser each include a rugged microstructure; the base further includes a through hole in communication with the receiving room, the light-emitting module further includes a conductive member, and the conductive member is disposed through the through hole and connected to the circuit board; the second side further includes a lens, and the annular wall surrounds the lens; the first side further includes a projection projecting in the axial direction, and the projection includes the first diffuser; each of the at least one light-emitting member is a LED member; the circuit board is secured to a bottom of the receiving room by at least one threaded fastener.

5. The vehicle warning lamp of claim 1, wherein each of the at least one inclined portion is inclined from the second side toward the first side.

6. The vehicle warning lamp of claim 5, wherein the at least one plane portion is perpendicular to the axial direction, the at least one inclined portion and the at least one plane portion define an included angle therebetween, and the included angle ranges between 95 degrees and 145 degrees.

7. The vehicle warning lamp of claim 1, wherein the at least one inclined portion includes at least two inclined portions, the at least one plane portion includes at least two plane portions, one of the at least two plane portions is located between one of the two at least inclined portions and a periphery of the second side, and between neighboring two of the at least two inclined portions is one of the at least two plane portions.

8. The vehicle warning lamp of claim 1, wherein the at least one inclined portion and the at least one plane portion are annular, and the at least one inclined portion and the at least one plane portion are concentrically arranged.

9. The vehicle warning lamp of claim 1, wherein the light-emitting module includes a circuit board and a plurality of light-emitting members, the plurality of light-emitting members are disposed on a side of the circuit board facing toward the light guide, the receiving room is located within the axial projection area of the first diffuser, and the first diffuser and the second diffuser each include a rugged microstructure.

10. The vehicle warning lamp of claim 9, wherein the base further includes a through hole in communication with the receiving room, the light-emitting module further includes a conductive member, and the conductive member is disposed through the through hole and connected to the circuit board.

* * * * *